US012614352B2

(12) United States Patent (10) Patent No.: US 12,614,352 B2
Cristian et al. (45) Date of Patent: Apr. 28, 2026

(54) MULTI-CAMERA HIGH SPEED SIMULTANEOUS LOCALIZATION AND MAPPING (SLAM) FOR A HEAD MOUNTED DISPLAY

(71) Applicant: Rivet Industries, Inc., Washington, DC (US)

(72) Inventors: Calin Cristian, Iasi (RO); Jouya Jadidian, Los Gatos, CA (US); Seyedsohrab Madani, Menlo Park, CA (US); Mohit Narang, Cupertino, CA (US)

(73) Assignee: Rivet Industries, Inc., Washington, DC (US)

( * ) Notice: Subject to any disclaimer, the term of this patent is extended or adjusted under 35 U.S.C. 154(b) by 0 days.

(21) Appl. No.: 19/204,418

(22) Filed: May 9, 2025

(65) Prior Publication Data

US 2025/0349076 A1 Nov. 13, 2025

Related U.S. Application Data

(60) Provisional application No. 63/646,465, filed on May 13, 2024.

(51) Int. Cl.
*G06T 17/05* (2011.01)
*G06T 7/215* (2017.01)
(Continued)

(52) U.S. Cl.
CPC .............. *G06T 17/05* (2013.01); *G06T 7/215* (2017.01); *G06T 7/251* (2017.01); *G06T 7/292* (2017.01);
(Continued)

(58) Field of Classification Search
None
See application file for complete search history.

(56) References Cited

U.S. PATENT DOCUMENTS 8,678,282 B1 3/2014 Black et al.
9,953,618 B2 4/2018 Ramachandran et al.
(Continued)

FOREIGN PATENT DOCUMENTS

WO WO-2023230085 A1 11/2023

OTHER PUBLICATIONS

Lai, C-J. et al., "View interpolation for video see-through head-mounted display," SIGGRAPH '16: ACM SIGGRAPH 2016 Posters, (Jul. 24, 2016), Article No. 57; 2 pages.
(Continued)

*Primary Examiner* — James A Thompson
(74) *Attorney, Agent, or Firm* — COOLEY LLP

(57) ABSTRACT

In one or more embodiments, instructions that, when executed by a processor, cause the processor to: locate, based on a sensor fusion of a second camera and a second sensor, a first compute device in a map of a 3D scene to define a first device location; calculate, based on the map of the 3D scene and a first sensor, a relative pose of a second compute device with respect to a first compute device location; determine, based on the relative pose, a region of overlap between a FOV of the first camera and a FOV of the second camera; identify, based on the region of overlap, an occluded portion of the second FOV; and send a signal to cause the display to project a plurality of image frames within the second FOV and to reproject the visible portion of the first FOV.

20 Claims, 6 Drawing Sheets

(51) Int. Cl.
    *G06T 7/246*         (2017.01)
    *G06T 7/292*         (2017.01)
    *G06T 7/579*         (2017.01)

(52) U.S. Cl.
    CPC .... *G06T 7/579* (2017.01); *G06T 2207/10048* (2013.01); *G06T 2207/30244* (2013.01); *G06T 2210/08* (2013.01)

(56) References Cited

U.S. PATENT DOCUMENTS

| | | | |
|---|---|---|---|
| 12,106,534 B2 * | 10/2024 | Valluru | G06T 11/00 |
| 2017/0045736 A1 | 2/2017 | Fu | |
| 2020/0012352 A1 | 1/2020 | Yang | |
| 2021/0200497 A1 | 7/2021 | Torii et al. | |
| 2021/0257084 A1 | 8/2021 | Freeman et al. | |
| 2022/0171187 A1 | 6/2022 | Bleyer et al. | |
| 2023/0128392 A1 * | 4/2023 | Sagong | H04N 13/271 382/103 |
| 2024/0257309 A1 * | 8/2024 | Holland | G06T 7/30 |
| 2024/0265570 A1 * | 8/2024 | Shirguppe | G06T 7/74 |
| 2025/0168313 A1 * | 5/2025 | Chui | G06T 17/00 |

OTHER PUBLICATIONS

PCT Application No. PCT/US2025/029032, International Search Report and Written Opinion of the International Searching Authority mailed Sep. 24, 2025; Applicant by Rivet Industries, Inc.; 15 pages.

Andersen, M. V. et al., "Learning to Find Missing Video Frames with Synthetic Data Augmentation: A General Framework and Application in Generating Thermal Images Using RGB Cameras," arXiv:2403.00196 [cs.CV], Feb. 29, 2024; 6 pages.

Kniaz, V. V. et al., "ThermalGAN: Multimodal Color-to-Thermal Image Translation for Person Re-identification in Multispectral Dataset," Computer Vision—ECCV 2018 Workshops (ECCV 2018), Jan. 23, 2019, pp. 606-624.

Parmar, G. (GaParmar), "img2img-turbo," Github.com, published on Sep. 8, 2024. Retrieved from https://github.com/GaParmar/img2img-turbo, [retrieved on Jun. 23, 2025]; 4 pages.

U.S. Appl. No. 19/074,963, filed Mar. 10, 2025, by Jadidian et al.

* cited by examiner

200

Image Feed 510

MULTI-CAMERA HIGH SPEED SIMULTANEOUS LOCALIZATION AND MAPPING (SLAM) FOR A HEAD MOUNTED DISPLAY

CROSS-REFERENCE TO RELATED APPLICATION

This application claims priority to U.S. Provisional Patent Application No. 63/646,465, filed on May 13, 2024 and titled "Multi-Camera High Speed Simultaneous Localization and Mapping (SLAM) for a Head Mounted Display," which is incorporated by reference herein.

FIELD

The present disclosure generally relates to field of imaging, and more specifically to systems, devices, and methods for providing multi-camera simultaneous localization and mapping (SLAM). In some embodiments, systems, devices, and methods described herein are used with a head mounted display (HMD).

BACKGROUND

An HMD can be used, for example, for a virtual reality (VR), mixed reality (MR), or augmented reality (AR) experience. In some situations, the HMD can be in a physical environment with a second device (e.g., an auxiliary device) and it can be desirable to track and illustrate the position and/or orientation of the second device on the HMD and to visually indicate on the HMD the region of overlap between field-of-views (FOVs) of the two devices, when overlap exists.

It can be difficult, however, to perform relative pose estimation between an HMD and a second device that is physically uncoupled from the HMD, for example, within the context of an MR or AR experience. Such relative pose estimation can be especially difficult, for example, in certain situations such as low light environments, situations with sparse visual features, situations with a requirement of no active illumination or radiation, situations where line-of-sight between the two devices is not guaranteed, situations where a shared FOV between the two devices is not guaranteed, situations where the two devices may have different application processors, and/or situations where failure of either device is to be tolerated temporally.

Thus, a need exists to improve pose estimation between an HMD and a second device.

SUMMARY

In one or more embodiments, a second compute device includes a first camera and a first sensor. The first camera has a first Field-of-View (FOV). A first compute device is configured to be communicatively coupled to the second compute device. The first compute device includes a second camera, a second sensor, a display, a processor, and a non-transitory, processor-readable medium. The second camera has a second FOV greater than the first FOV. The non-transitory, processor-readable medium stores instructions that, when executed by the processor, cause the processor to: receive a map of a 3D scene; locate, based on a sensor fusion of the second camera and the second sensor, the first compute device in the map of the 3D scene to define a first device location; calculate, based on the map of the 3D scene and the first sensor, a relative pose of the second compute device with respect to the first compute device location; determine, based on the relative pose of the second compute device, a region of overlap between the first FOV and the second FOV; identify, based on the region of overlap, an occluded portion of the second FOV, the occluded portion of the second FOV being a visible portion of the first FOV; and send a signal to cause the display to project a plurality of image frames within the second FOV and to reproject the visible portion of the first FOV.

In one or more embodiments, a method includes generating a map of a 3D scene based on a first set of image frames of a first compute device; locating the first compute device in the map of the 3D scene to define a first compute device location, based on a sensor fusion of a first sensor and a second sensor of the first compute device; matching features in a second set of image frames of a third sensor of a second compute device to features in the map of the 3D scene, to define a region of overlap between the first set of image frames and the second set of image frames; calculating, based on the region of overlap, a relative pose of the second compute device with respect to the first compute device location; sending a first signal to display the first set of image frames; and sending a second signal to display a bounding box associated with the region of overlap based on the relative pose of the second compute device.

DETAILED DESCRIPTION

Systems, devices, and methods described herein relate to localization and mapping using multiple devices equipped with imaging devices, including, for example, a main device including a first camera and a secondary or auxiliary device including a second camera, where the first camera has a wider FOV than the second camera. The FOV of a camera can also be represented herein as a frustum of a camera in the context of a virtual three-dimensional (3D) space. As such, in embodiments described herein, the main device is described as having a wide FOV while the auxiliary device is described as having a narrow FOV. In some embodiments, the main device can be an HMD. The auxiliary device can be physically uncoupled and free roaming from the HMD, which can make it difficult to estimate the relative pose of the auxiliary device relative to the main device, especially in conditions including low light, where no active illumination or radiation can be used, with sparse visual features, where line-of-sight between the main device and auxiliary device is not provided, where the main device and the auxiliary device have different application processors, and/or where temporary failure of the main device or the auxiliary device is to be tolerated. In some embodiments, systems, devices, and methods described herein can be configured to perform relative pose estimation of the main device and auxiliary device, which can be used to track and illustrate the orientation (also referred to herein as an angle or a rotation) of the auxiliary device relative to the main device (e.g., the HMD) and/or to visually indicate the region of overlap between the view from the main device and the view from the auxiliary device.

Figure 1:
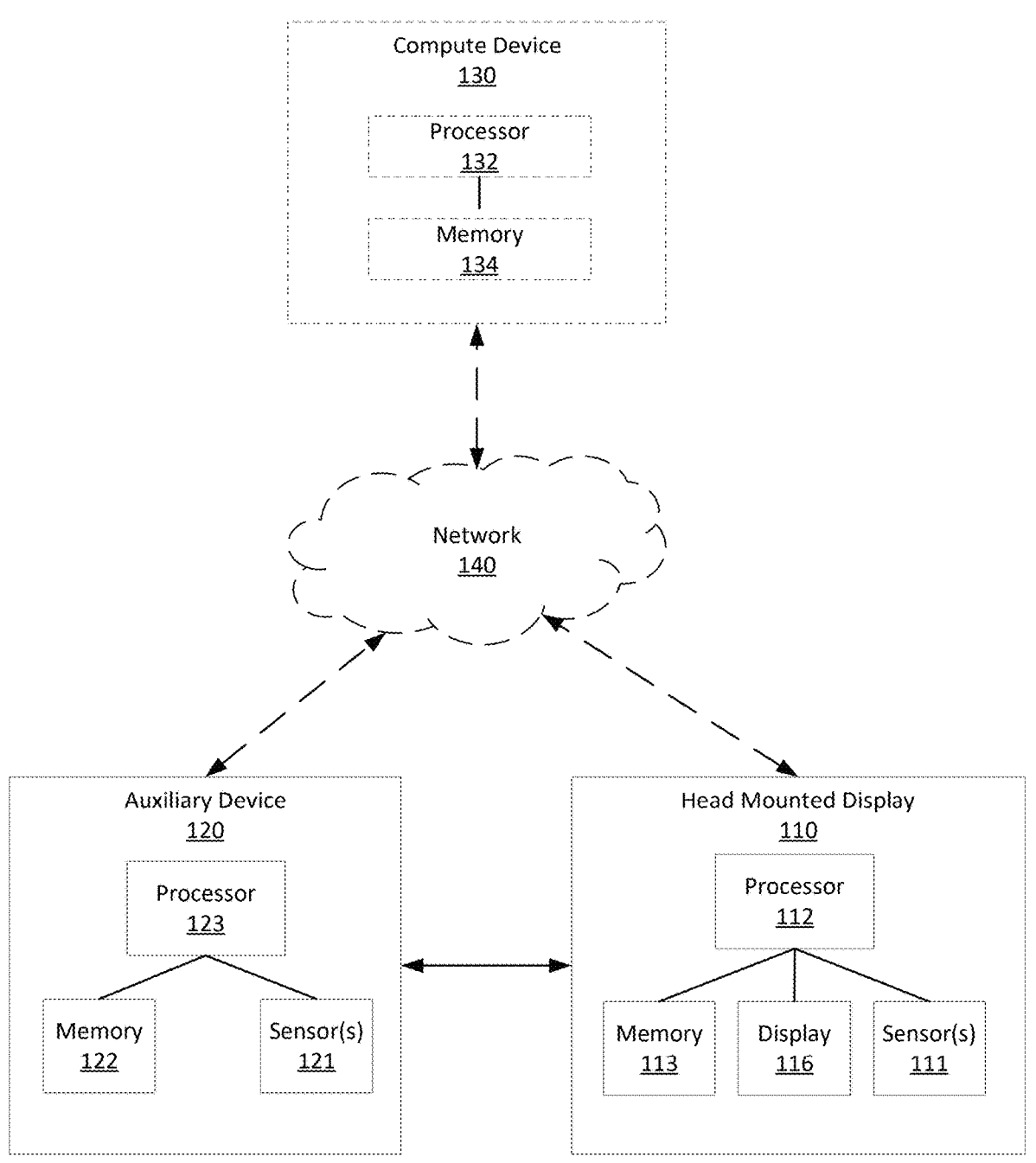
FIG. 1 is a block diagram of a system of devices that localizes and maps image data from multiple devices, including an HMD, according to some embodiments.

FIG. 1 is a block diagram of a system of devices that localizes and maps image data from multiple devices, according to an embodiment. As shown in FIG. 1, the system includes a main device implemented as an HMD 110 and an auxiliary device 120, which are in communication with one another. Optionally, the system can also include one or more other devices, such as one or more compute devices 130, which can be coupled with the HMD 110 and/or the auxiliary device 120 via a communications network 140.

The HMD 110 can be, for example, a display device, worn on the head of a user or as part of a helmet that has a small display optic in front of one eye or each eye. In some embodiments, the HMD 110 is a virtual reality (VR) headset that tracks three-dimensional (3D) position and rotation to provide a virtual environment to the user. Such a virtual reality headset of HMD 110 can be a three-degree of freedom (3DOF) VR headset for example having an inertial measurement unit (IMU) or a 6DOF VR headset for example using sensor fusion from multiple sensors/data sources including at least one IMU. Such IMU and/or multiple sensors are shown in FIG. 1 as sensor(s) 111 of HMD 110. In addition to an IMU, sensor(s) 111 can include for example an accelerometer, a gyroscope, a camera, a red-green-blue (RGB) camera, a low light camera, a time of flight (TOF) camera, a depth camera, a thermal imager, a WiFi® sensor (e.g., a WiFi® receiver or a WiFi® transceiver), a radar sensor, a magnetometer, etc. In some embodiments, the HMD 110 is an AR or MR device, such as a headset, glasses, goggles, etc. Similar to the VR headset, the AR or MR device can include one or more sensor(s) 111 that can track information regarding the user and/or an environment surrounding the user.

In some embodiments, the sensor(s) 111 can include imaging devices, such as, for example, a thermal camera, infrared camera, optical camera, etc. In some embodiments, the imaging device can be a wide FOV camera. The imaging devices can capture an environment around a user of the HMD. For example, the imaging devices can capture an image feed or image data of a scene or environment around a user wearing the HMD 110.

HMD 110 can also include a processor 112, a memory 113, a display 116, and a communications interface (not shown). Processor 112 can be coupled to sensors 111, memory 113, display 116, and the communications interface. The processor 112 (e.g., a central processing unit (CPU), a graphics processing unit (GPU), and/or the like) can be, for example, a hardware-based integrated circuit (IC) or any other suitable processing device configured to run or execute a set of instructions or codes. In some embodiments, the processor 112 can execute instructions stored in memory 113 to perform one or more processes and/or functions associated with SLAM, including processing sensor data (e.g., image data, IMU data), determining a relative pose of the auxiliary device 120 relative to the HMD 110, generating or modifying a map, projecting or reprojecting via the display 116 a view to a user of the HMD 110, etc. An example of a method for performing multi-camera SLAM is described below with reference to FIG. 2. The memory 113

(e.g., a random-access memory (RAM), a hard drive, a flash drive, and/or the like) of HMD 110 can store data, and/or code that includes instructions to cause the processor 112 to perform one or more processes or functions. The communication interface (e.g., a network interface card (NIC), a Wi-Fi® transceiver, a Bluetooth® transceiver, and/or the like) can be a hardware component that facilitates data communication between HMD 110 and other devices (e.g., the auxiliary device 120, the compute device 130, compute devices coupled to communications network 140 but not shown in FIG. 1, and/or the like).

Sensor fusion can be (or include) a process/algorithm for combining data from multiple sensors (e.g., the sensors 111) to produce output with less uncertainty (or a more accurate information) than if the data from each sensor were processed individually. Sensor fusion can provide, for example, a more complete, accurate, and reliable description of an environment. Sensor fusion algorithms can be implemented by a processor (e.g., the processor 112) and stored in a memory (e.g., the memory 113). Sensor fusion algorithms can include, for example, algorithms based on the central limit theorem (CLT), algorithms based on Bayesian networks, convolutional neural networks (CNN), and/or a Kalman filter. In an example, the processor 112 can use a Kalman filter to determine an accurate location of the HMD 110 using a combination of image data from an image sensor of the HMD 110 and motion data from an IMU of the HMD 110, even if data from either sensor is noisy.

The auxiliary device 120 can be, for example, a compute device that is physically uncoupled from and free roaming with respect to the HMD 110. The auxiliary device 120 can include a memory 122, a processor 123 and a communications interface (not shown). Memory 122, processor 123 and the communications interface of auxiliary device 120 can be similar to the memory 113, processor 112 and the communications interface of HMD 110.

Additionally, the auxiliary device 120 can include sensor(s) 121. The sensor(s) 121 can include an IMU configured to measure information indicative of motion (also referred to herein as a motion sensor), such as, for example, acceleration, specific force, angular rate, etc. In addition to an IMU, the sensor(s) 121 can include for example an accelerometer, a gyroscope, a camera, a thermal imager, a WiFi® sensor (e.g., a WiFi® receiver or a WiFi® transceiver), a radar sensor, a magnetometer, etc. The sensor(s) 121 can also include imaging devices, such as, for example, a thermal camera, infrared camera, optical camera, a TOF camera, etc. In some embodiments, the imaging device can be a narrow FOV camera. The narrow FOV camera can be configured to capture image data, which can be matched with image data captured by the HMD 110, which can be used for localization of the auxiliary device relative to the HMD 110 and/or image mapping and reprojection.

In some embodiments, the auxiliary device 120 can be implemented as a portable device, such as, for example, a pen, a laser pointer, an endoscope or endoscopic instrument, a handheld tool, a firearm, a VR controller, etc. In some embodiments, the auxiliary device 120 can be coupled to or disposed on the user wearing the HMD 110 (e.g., disposed on a wrist, hand, chest, etc. of the user) or located near the user (e.g., on a nearby person). In some embodiments, the auxiliary device 120 can be configured to be communicatively coupled to the HMD 110, e.g., without the communications network 140. For example, the auxiliary device 120 can connect via wireless connection to the HMD 110. The auxiliary device 120 can be configured, via its communications interface (not shown), to directly send information to the HMD 110. For example, the auxiliary device 120 can be configured to send IMU data and image data to the HMD 110, such that the HMD 110, via processor 112, can be configured to perform localization and/or mapping. The auxiliary device 120 can be configured to send the IMU data and/or image data repeatedly or continuously, e.g., multiple times a second, multiple times a minute, every minute, or every few minutes, etc.

While a single auxiliary device 120 is shown connected to the HMD 110 in FIG. 1, it can be appreciated that more than one auxiliary device 120 can be connected to the HMD 110. For example, a user of an HMD 110 can be carrying or manipulating multiple devices (e.g., a pen and a tool, multiple endoscopic instruments, etc.), which each can be connected to the HMD 110 and can send data (e.g., IMU data, image data) to the HMD 110. In some embodiments, one or more auxiliary devices that are coupled to the HMD 110 (e.g., not free roaming devices) can also be used in conjunction with one or more uncoupled auxiliary devices (e.g., free roaming devices).

Optionally, the HMD 110 can be coupled one or more additional compute devices 130, e.g., directly or via network 140. The compute device(s) 130 can include, for example, a memory 134, a processor 132 and a communications inter-face (not shown). Memory 134, processor 132 and the communications interface of compute device 130 can be similar to the memory 113, processor 112 and the communications interface of HMD 110.

The communications network 140 can be any suitable communications network for transferring data, operating over public and/or private communications networks. For example, the communications network 140 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communications network 140 can be a wireless network such as, for example, a Wi-Fi or wireless local area network ("WLAN"), a wireless wide area network ("WWAN"), and/or a cellular network. In other instances, the communications network 140 can be a wired network such as, for example, an Ethernet network, a digital sub-scription line ("DSL") network, a broadband network, and/or a fiber-optic network. The communications sent via the communications network 140 can be encrypted or unen-crypted. In some instances, the communications network 140 can include multiple networks or subnetworks opera-tively coupled to one another by, for example, network bridges, routers, switches, gateways and/or the like.

Figure 2:
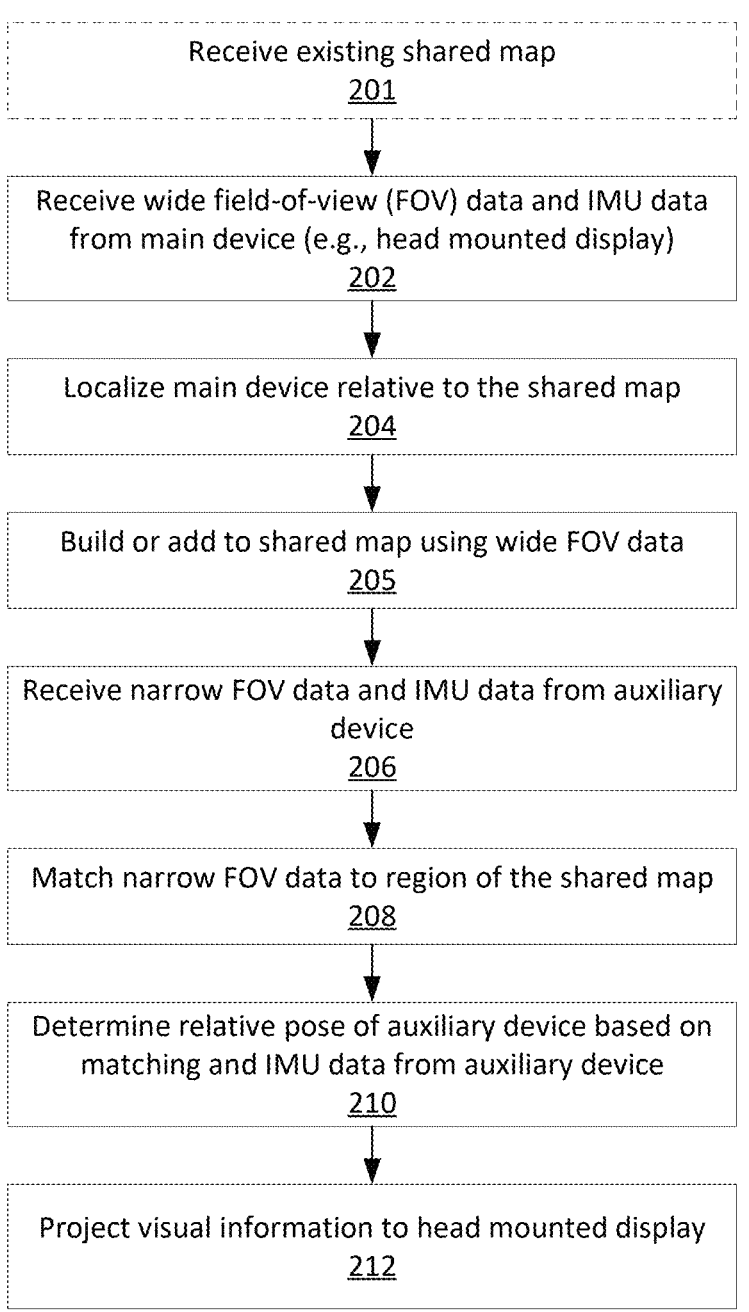
FIG. 2 is a flow chart of a method for multi-device SLAM, according to some embodiments.

FIG. 2 depicts a flow chart of an example method 200 for performing SLAM involving multiples devices, according to embodiments. The method 200 can be executed or imple-mented by a processor (or multiple processors), such as, for example, the processor 112 of the HMD 110.

At 201, the processor can optionally receive existing map data, when available. The existing map data can include, for example, an existing map that is shared between a main device (e.g., HMD 110) and one or more auxiliary devices (e.g., auxiliary device 120). The existing map may be a map of a larger scene or environment, which has been pieced together or generated based on earlier image data captured in the main device, auxiliary device, and/or other imaging devices.

At 202, the processor can receive image data and IMU data from sensors (e.g., sensor(s) 111) of the main device. In some embodiments, the image data can be wide FOV images, e.g., captured using a wide FOV thermal camera. The image data can provide the three-dimensional (3D) scene that is encountered by the main device.

At 204, the processor can localize the main device relative to the existing map received at 201. For example, the processor can map the wide FOV image data to the existing map. Alternatively, if no existing map was received at 201, then the processor, at 205, can be configured to generate a map of the scene using the wide FOV image data. The processor can then localize the main device with respect to the map. In some embodiments, the processor can also perform image segmentation to segment inert (lacking the ability to move) and non-inert (having the ability to move) elements in the scene. For example, the processor can perform image segmentation to distinguish between static elements (inert elements) and movable objects such as vehicles and humans (non-inert elements) in the scene. The processor can perform image segmentation to generate and/or receive a map with a more complete description of the scene.

At 206, the processor can receive image data and IMU data from an auxiliary device (e.g., auxiliary device 120). In some embodiments, the image data can be narrow FOV images, e.g., captured using a narrow FOV thermal camera. The auxiliary device can be used to capture additional information regarding the 3D scene, such as, for example, areas around obstructions or obstacles and/or areas outside of the wide FOV of the main device. The auxiliary device can be configured to be manipulated by a user (e.g., a user wearing the HMD) to view around obstacles, such as, for example, a human or other object that is blocking the user's view of the scene, tissue or other anatomical parts blocking a user's view of a target region, etc. In some embodiments, the image data of the auxiliary device may capture a region of the scene that overlaps with that captured by the image data of the main device.

At 208, the processor can match the scene captured by the image data to a region of the map. Such matching can be based on mapping features shared between the FOV of the auxiliary device and the map. For example, the processor can identify features in the wide FOV data (associated with the map) and the narrow FOV data and, if there is overlap between the image data, produce a bounding box to show the overlap between the narrow FOV data and the wide FOV data. Then common key points (e.g., distinctive points such as edge points and discontinuity points) are mapped between the wide FOV image data and the narrow FOV image data. The mapping can reveal the differences in the images captured by the main device and the images captured by the auxiliary device, e.g., given the different angles at which the main device and the auxiliary device are viewing the same region in a scene. In some embodiments, segmentation of the image data may be performed to facilitate the mapping.

At 210, the processor can determine the relative pose (e.g., position, orientation) of the auxiliary device to the main device by localizing the auxiliary device relative to the map. Such localization can be based on the matching of the FOV of the auxiliary device to the region of the map and the IMU data of the auxiliary device. The IMU data of the auxiliary device can be used to refine the relative pose of the auxiliary device. In instances where the FOV of the auxiliary device captures a portion of a view that is occluded in the FOV of the main device, the matching and the determination of the relative pose of the auxiliary device can be based on pre-existing map information (or FOVs captured by the main device and/or auxiliary device) and the IMU data of the auxiliary device.

At 212, the processor can project visual information to an HMD being worn by a user. As noted above, the HMD can be the main device. The projected visual information can correspond to the user's FOV at the HMD. In some embodiments, the projected visual information can include the wide FOV data provided by the main device and the narrow FOV data provided by the auxiliary device. The wide FOV and/or the narrow FOV data can be filtered, e.g., to improve the accuracy and angle at which the visual information is presented to the user of the HMD. In embodiments described herein, the processor can be configured to project visual information to the HMD even if one of the devices (e.g., the auxiliary device) were to fail. This is in contrast to known techniques that simultaneously use the data/frames of two devices to map a scene, where the failure of one device may compromise the rendering or projection of the visualization of the scene.

In some embodiments, the processor can determine in real time or substantially real time which sensor (e.g., main device or auxiliary device) is capturing richer and/or higher quality image data (e.g., anchor maps), and use the image data from that sensor to generate or add to the map. As such, the processor may perform 205 after receiving the image data from the auxiliary device at 206, and after determining whether the sensor of the main device or the sensor of the auxiliary device has captured richer image data. Depending on the determination, the processor, at 205, can generate the map (or add to the map) based on the sensor that has captured the richer image data. In some embodiments, the sensor can be configured to switch between two sensors, e.g., depending on the live image data capture of the two sensors. For example, if the main device sensor were to drop in quality (e.g., due to an obstruction, dust, etc.) or fail, then the processor can switch to the auxiliary device sensor. Similarly, if the auxiliary device sensor were to drop in quality or fail, then the processor can switch to the main device sensor.

Figure 3:
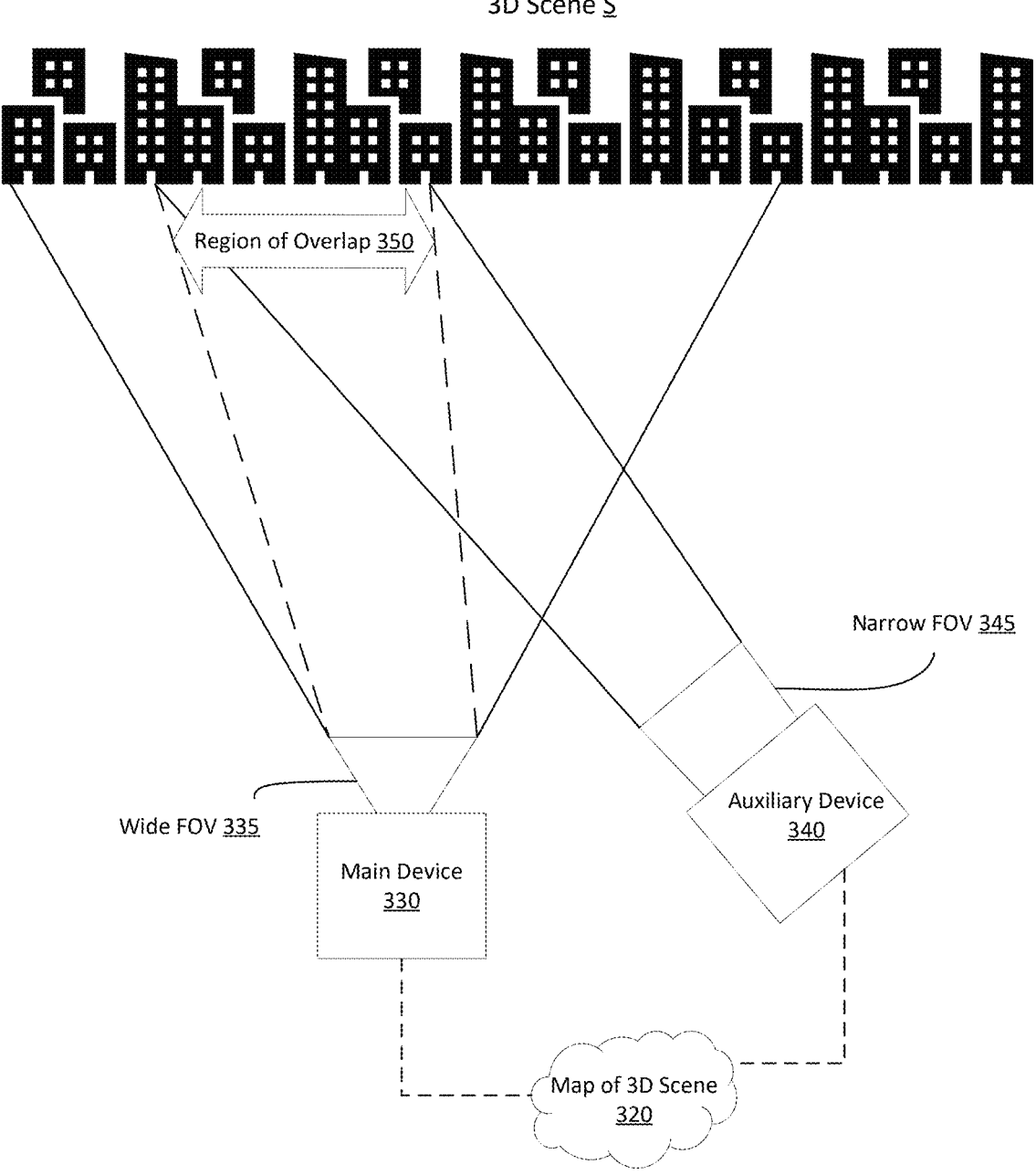
FIG. 3 is an illustration of a scenario in which a region of overlap exists among a system of devices, according to some embodiments.

FIG. 3 is an illustration of a scenario in which a region of overlap exists among a set of devices, according to some embodiments. The set of devices can include, for example, a main device 330 and an auxiliary device 340. The main device 330 can be functionally and structurally similar to the HMD 110 of FIG. 1. The auxiliary device 340 can be functionally and structurally similar to the auxiliary device 120 of FIG. 1. As shown in FIG. 3, the main device 330 can be physically uncoupled from the auxiliary device 340. The main device 330 can be communicatively coupled to the auxiliary device 340 (e.g., via the network 140 of FIG. 1). In some other instances, the main device 330 can be physically coupled to the auxiliary device 340.

Sensor(s) of the main device 330 (e.g., the sensor(s) 111 of FIG. 1) can include an image sensor (e.g., a camera, a multispectral camera, an infrared camera, and/or etc.) having a wide FOV 335. For example, an optical system including lenses can be configured to define a focal length of the main device 330, which can in turn define the FOV of the main device 330. The image sensor can be configured to capture a portion of a 3D scene S and relay an image feed associated with the portion of the 3D scene S to a processor of the main device 330 (e.g., the processor 112 of FIG. 1). The processor can cause the image feed to be displayed on a display of the main device 330 (e.g., the display 116 of FIG. 1) in real-time or in substantially real-time (e.g., with little or no perceivable delay) relative to receiving the image feed from the image sensor.

The display of the main device 330 can display a substantially real-time image feed. The substantially real-time image feed can include a substantially real-time display of the portion of the 3D scene S that is being captured by the image sensor of the main device 330. The substantially real-time image feed can also include a substantially real-time display of visual indicators. The visual indicators can be associated with a field of view (FOV) of another device (e.g., the narrow FOV 345 of the auxiliary device 340), and/or a region of overlap 350 between the substantially real-time image feed and an image feed/FOV of another sensor (e.g., the image sensor/narrow FOV 345 of the auxiliary device 340). The visual indicators can be, for example, a bounding box, a dot, a shape, a color, a saturation, a contrast, a brightness, a resolution, and/or the like. The visual indicator of the narrow FOV 345 can be, for example, a red dot indicating where a line-of-sight in the narrow FOV 345 of the auxiliary device 340 is pointed, from the perspective of the main device 330. Stated another way, the visual indicator of the narrow FOV 445 can illustrate where the auxiliary device 340 is pointed, from the perspective of the main device 330. In some instances, the substantially real-time image feed can include a substantially real-time display of a different portion of the 3D scene S that is being captured by a different image sensor (e.g., an image sensor of the auxiliary device 340). For example, in response to a failure of the image sensor of the main device 330, the substantially real-time image feed can include a substantially real-time display of the image feed of the auxiliary device 340.

A memory of the main device 330 (e.g., the memory 113 of FIG. 1) can store code and/or instructions related to SLAM. The processor can execute code and/or instructions related to SLAM. For example, the processor can generate a map of the 3D scene 320 using the sensors, such as an image sensor, of the main device 330. The memory can store the map of the 3D scene 320. The map of the 3D scene 320 can be a point cloud, or a collection of spatial points that are represented as coordinates of a coordinate system. The map of the 3D scene 320 can include, for example an extended set of local features or key points in the image feed of the main device 330 assembled into a virtual 3D space. In some instances, the processor can update the map of the 3D scene with inert elements and non-inert elements using an image segmentation of the image feed of the main device 330 or an image feed of another device, such as the image feed of an image sensor of the auxiliary device 340. In some instances, the processor can receive a map of the 3D scene 320 from another device (e.g., the compute device 130 of FIG. 1) that is communicatively coupled to the main device 330 (e.g., via the network 140 of FIG. 1). The processor can then locate the main device 330 in the map of the 3D scene 320 based on a sensor fusion of an image sensor (e.g., an infrared (IR) camera) and another sensor (e.g., a motion sensor such as an IMU). In some instances, the processor can locate the main device 330 in the map of the 3D scene 320 using data from an individual sensor of the main device 330, such as an image sensor or a motion sensor, if a sensor fusion cannot be performed (e.g., one or more sensors of the main device 330 fail). The location of the main device 330 in the map of the 3D scene 320 can be a set of coordinates.

More specifically, in the example, the processor can establish a location and an orientation of the main device 330 in the map of the 3D scene 320 at a first time using at least motion data from the IMU (e.g., position, velocity, acceleration, orientation, angular velocity, etc.). The processor can then update the location and orientation of the main device 330 in the map of the 3D scene 320 at a second time after the first time using the motion data from the IMU. The process of continuously or repeatedly updating the location and orientation of the main device 330 in the map of the 3D scene 320 can establish a motion history of the main device 330, which can be stored in a memory of the main device 330. In the event of a sensor failure, the main device 330 can refine its location and orientation using the motion history of the main device 330. Furthermore, the processor can update the map of the 3D scene 320 with features of an environment (e.g., corners, edges, specific patterns, objects, landmarks, and/or the like) using image data from the IR camera. The processor can use feature matching to compare features in image data to known features (e.g., corners, edges, specific patterns, landmarks, and/or the like) in the map of the 3D scene 320 to determine how the main device 330 has moved relative to a previously known position. The processor can simultaneously update the map of the 3D scene 320 and track the location and orientation of the main device 330 in the map of the 3D scene 320 based on the features in the image data. The motion data of the IMU and/or the image data from the IR camera processed individually can produce a location and orientation of the main device 330 in the map of the 3D scene 320 that is less accurate than if the sensor data were processed using sensor fusion, such as a Kalman filter. The processor can use a Kalman filter to determine an accurate location and orientation of the main device 330 in the map of the 3D scene 320 using a combination of image data from the IR camera of the main device 330 and motion data from the IMU of the main device 330.

Sensor(s) of the auxiliary device 340 (e.g., the sensor(s) 121 of FIG. 1) can include an image sensor (e.g., a camera, a multispectral camera, an infrared camera, etc.) having a narrow FOV 345 relative to the image sensor of the main device 330. Stated another way, the image sensor with the narrow FOV 345 can capture less of the 3D scene S than the image sensor with the wide FOV 335. For example, an optical system including lenses can be configured to define a focal length of the auxiliary device 340, which can in turn define the FOV of the auxiliary device 340. The image sensor can be configured to capture a portion of a 3D scene S and relay an image feed of the portion of the 3D scene S to a processor of the auxiliary device 340 (e.g., the processor 123 of FIG. 1).

The processor of the auxiliary device 340 can store the image feed in a memory of the auxiliary device 340 (e.g., the memory 122 of FIG. 1). In some instances, the processor of the auxiliary device 340 can identify local features in the image feed of the auxiliary device 340 and can query the map of the 3D scene 320 based on the local features. The processor of the auxiliary device 340 can send the image feed of the auxiliary device 340 to the main device 330 in real-time or substantially real-time relative to capturing the image feed at the auxiliary device 340. In some instances, the processor of the auxiliary device 340 can send the image feed of the auxiliary device 340 to the main device 330 without storing the image feed in the memory of the auxiliary device 340. In some instances (not shown), the image feed of the auxiliary device 340 can capture a different portion of the 3D scene S from the image feed of the of the main device 330. As shown in FIG. 3, the image feed of the auxiliary device 340 can overlap with a portion of the image feed of the main device 330 to define a region of overlap 350.

The memory of the main device 330 can further store code and/or instructions to identify a region of overlap 350 between the image feed of the auxiliary device 340 and the image feed of the main device 330, as illustrated by the scenario of FIG. 3. The main device 330 can receive the image feed of the auxiliary device 340. The processor of the main device 330 can identify local features in the image feed of the auxiliary device 340 and add the local features to the map of the 3D scene 320. The processor of the main device 330 can identify local features in the map of the 3D scene 320 that match and/or correspond to local features in the image feed of the auxiliary device 340, using, for example, template matching, direct pixel comparison, and/or machine learning such as neural networks, k-nearest neighbors (kNN), and/or computer vision including feature matching algorithms. In response to identifying matching features, the processor of the main device 330 can determine the region of overlap 350.

The memory of the main device 330 can further store code and/or instructions to calculate a relative pose of the auxiliary device 340 with respect to the location of the main device 330 in the map of the 3D scene 320. The relative pose can include a distance from a reference point of the auxiliary device 340 to a corresponding reference point of the main device 330 and/or an angle of the auxiliary device 340 relative to the main device 330. For example, the reference point can be a center of the narrow FOV 345 and the corresponding reference point can be a center of the wide FOV 335. For example, the angle of the auxiliary device 340 relative to the main device 330 can be an angle between a line of sight from the center of the narrow FOV 345 and a line of sight from the center of the wide FOV 335. The distance can be mathematically represented as, for example, a translation vector. The angle/rotation can be mathematically represented as, for example, a rotation matrix. The relative pose can be mathematically represented by, for example, a transformation matrix including the translation vector and the rotation matrix. The processor of the main device 330 can calculate the relative pose of the auxiliary device 340 using features in the region of overlap 350 and/or sensor(s) of the auxiliary device 340 (e.g., an IMU). The relative pose can be stored in the map of the 3D scene 320 to define an auxiliary device location and/or direction in the map of the 3D scene 320.

The processor of the main device 330 can calculate a distance to the auxiliary device 340 using an example method described herein. In the example method, the processor of the main device 330 can calculate a disparity/displacement for each matching local feature in the image feed of the auxiliary device 340 and the image feed of the main device 330. The disparity can be a pixel shift between a point in the image feed of the auxiliary device 340 and a corresponding point in the image feed of the main device 330. The processor of the main device 330 can estimate a first depth for each matching local feature in the image feed of the auxiliary device 340 relative to the center of the narrow FOV 345 using the disparity and camera parameters (e.g., focal length, baseline, etc.) of the auxiliary device 340. The first depth for each matching local feature can be mathematically represented as a first vector from the center of the narrow FOV 345 to the matching local feature. The processor of the main device 330 can also estimate a second depth for each matching local feature in the image feed of the main device 330 relative to the center of the wide FOV 335 using the disparity and camera parameters of the main device 330. The second depth for each matching local feature can be mathematically represented as a second vector from the center of the wide FOV 335 to the matching local feature. The processor of the main device 330 can subsequently subtract the first depth (as a first vector) from the second depth (as a second vector) to calculate a distance (as the translation vector) to the auxiliary device 340. The processor of the main device 330 can determine angle(s) between the first vector and the second vector to produce an angle/rotation of the auxiliary device 340 relative to the main device 330. More specifically, the angle/rotation of the auxiliary device 340 can be an angle/rotation of the center of the narrow FOV 345 relative to the center of the wide FOV 335.

The processor of the main device 330 can also use motion data (e.g., an IMU) of the auxiliary device 340 to refine the distance to the auxiliary device 340 and/or the angle/rotation of the auxiliary device 340 relative to the main device 330. For example, the processor of the main device 330 can identify a location of the auxiliary device 340 using the motion data of the IMU and an angle/rotation of the auxiliary device 340 with reference to a coordinate system of the IMU (e.g., the Earth-centered Earth-fixed (ECEF) reference frame). The processor of the main device 330 can compare the location and the angle/rotation of the auxiliary device 340 to the location and the angle/rotation of the main device 330, which can be measured by IMU sensors with a reference frame common to the IMU sensor of the auxiliary device 340 (e.g., the ECEF frame). The processor can subsequently produce and/or refine the relative pose of the auxiliary device 340 relative to the main device 330.

The memory of the main device 330 can further store code and/or instructions to project visual information to a display (e.g., the display 116 of FIG. 1). The visual information can include, for example, the image feed of the main device 330 and/or the image feed of the auxiliary device 340. The processor of the main device 330 can identify and/or track the region of overlap 350 in the image feed of the main device 330 based on the relative pose of the auxiliary device 340 and notify a user of the main device 330 of the region of overlap 350. For example, the processor of the main device 330 can send a signal to the display to project a visual indicator associated with the region of overlap 350 and/or with the narrow FOV 345 of the auxiliary device 340. The processor of the main device 330 can update the visual indicator (e.g., update a position of the visual indicator, or a feature of the visual indicator that can correspond to, for example, a severity/importance of local features in the region of overlap 350) in real-time or in substantially real-time (e.g., with little to no perceivable delay) relative to a change in the region of overlap 350.

Figure 4:
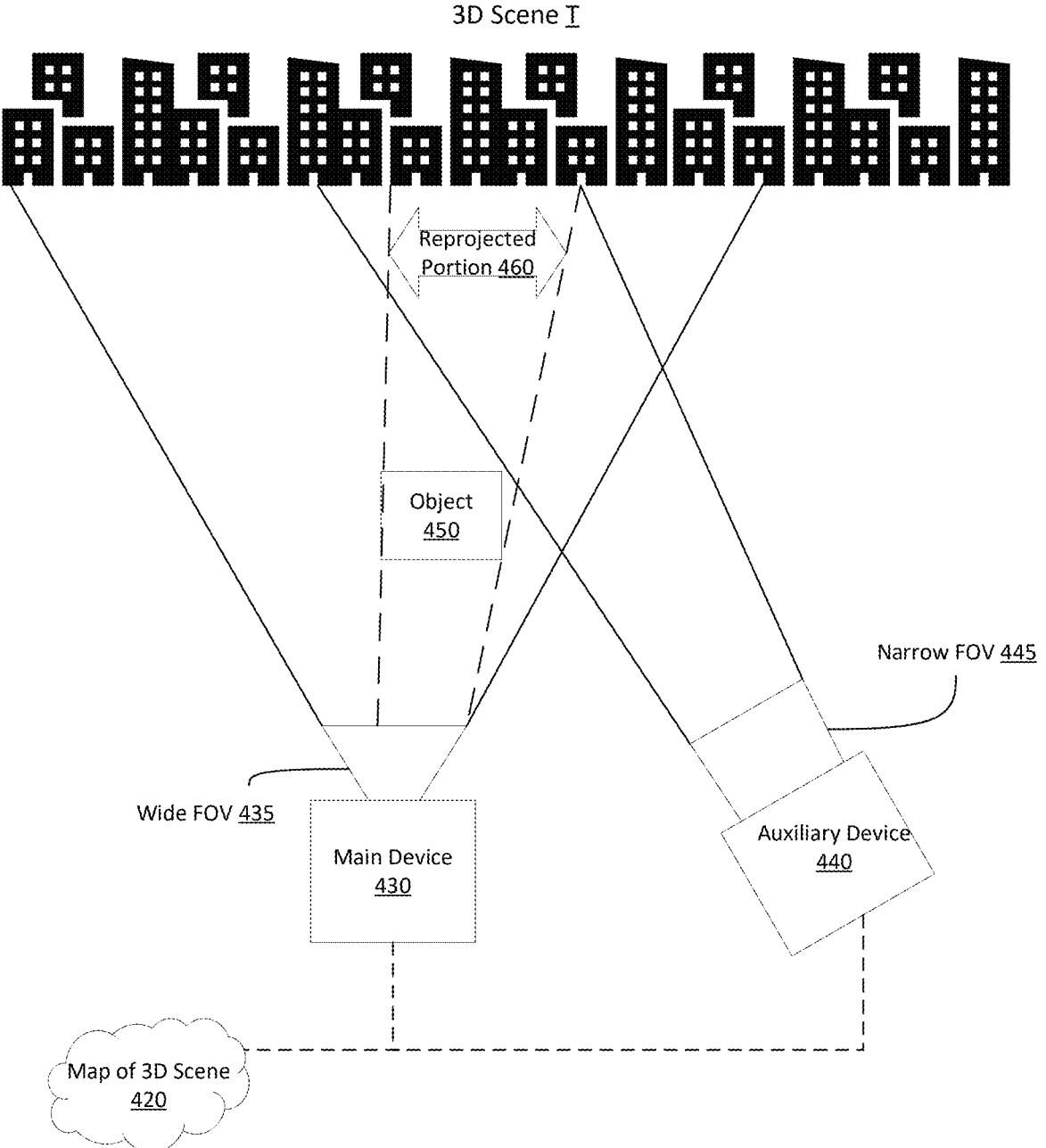
FIG. 4 is an illustration of a scenario in which an occluded portion of a 3D scene is reprojected to a display in a system of devices, according to some embodiments.

FIG. 4 is an illustration of a scenario in which an occluded portion of a 3D scene T is reprojected to a display in at least one device from a set of devices, according to some embodiments. The system of devices can include a main device 430 and an auxiliary device 440. The main device 430 can be functionally and structurally similar to the main device 330. The auxiliary device 440 can be functionally and structurally similar to the auxiliary device 340. The main device 430 can be physically uncoupled from the auxiliary device 440. The main device 430 can be communicatively coupled to the auxiliary device 440 (e.g., via the network 140 of FIG. 1). In some instances, the main device 430 can be physically coupled to the auxiliary device 440.

A memory of the main device 430 can store code and/or instructions that can be functionally similar to the code and/or instructions stored in the memory of the main device 330 in FIG. 3. A processor of the main device 430 can execute the code and/or instructions and can be functionally similar to the processor of the main device 330 in FIG. 3. In the scenario illustrated by FIG. 4, one or more objects (represented by object 450) can obstruct, occlude, and/or block a portion of a wide FOV 435 of a camera (e.g., an infrared camera) of the main device 430. The scenario illustrated in FIG. 4 can be altered to be the scenario illustrated in FIG. 3 if the object 450 were removed from the path of the main device 430.

The object 450 can cause an absence of information corresponding to the occluded portion of the wide FOV 435 in, for example, a map of the 3D scene. The memory of the main device 430 can store code and/or instructions to receive a map of the 3D scene 420 from another device (e.g., the auxiliary device 440) or from a time prior to object 450 occluding a portion of the wide FOV 435. In some instances, the processor of the main device 430 can update the map of the 3D scene with inert elements and non-inert elements using an image segmentation of an image feed of the main device 430 or an image feed of another device, such as an image feed of the auxiliary device 440.

The memory of the main device 430 can further store code and/or instructions to locate the main device 430 in the map of the 3D scene 420 using a sensor fusion of a camera of the main device 430 (e.g., an infrared camera) and other sensor(s) of the main device 430 (e.g., an IMU). The memory of the main device 430 can store the location of the main device 430 in the map of the 3D scene 420.

The memory of the main device 430 can further store code and/or instructions to calculate a relative pose of the auxiliary device 440 with respect to the main device 430 using the map of the 3D scene 420 and other sensor(s) of the auxiliary device 440 (e.g., an IMU). The relative pose can be stored in the map of the 3D scene 420 to define an auxiliary device location and/or direction in the map of the 3D scene 420.

The memory of the main device 430 can further store code and/or instructions to determine a region of overlap between the wide FOV 435 of the main device 430 and a narrow FOV 445 of a camera (e.g., an infrared camera) of the auxiliary device 440 using the relative pose of the auxiliary device 440. For example, as illustrated in FIG. 4, the processor of the main device 430 can determine that a region of overlap should exist based on the relative pose of the auxiliary device 440 despite an absence of information in the map of the 3D scene 420 based on the object 450. Similarly, the processor of the main device 430 can identify the occluded portion of the wide FOV 435 and determine that the occluded portion of the wide FOV 435 is a visible portion of the narrow FOV 445.

The memory of the main device 430 can further store code and/or instructions to project visual information to a display (e.g., the display of the main device 330 in FIG. 3). For example, the processor of the main device 430 can send a signal to cause the display to project an image feed from the camera of the main device 430. Similarly, the processor of the main device 430 can cause the display to reproject the visible portion of the narrow FOV 445 in the display rather than project the occluded portion of the wide FOV 435. The reprojected portion 460 can be the visible portion of the narrow FOV 445. The processor of the main device 430 can also cause the display to project a visual indicator associated with the region of overlap and/or with the narrow FOV 445 of the auxiliary device 440. The visual indicators can be functionally and/or structurally similar to the visual indicators of FIG. 3. The visual indicator of the narrow FOV 445 can be, for example, a circle indicating a region where a line-of-sight in the narrow FOV 445 of the auxiliary device 440 is, from the perspective of the main device 330. Stated another way, the visual indicator of the narrow FOV 445 can illustrate where the auxiliary device 340 is pointed, from the perspective of the main device 330. The processor of the main device 430 can update the visual indicator (e.g., update a position of the visual indicator, or a feature of the visual indicator that can correspond to, for example, a severity/ importance of local features in the region of overlap) in real-time or in substantially real-time (e.g., with little to no perceivable delay) relative to a change in the region of overlap.

Figure 5:
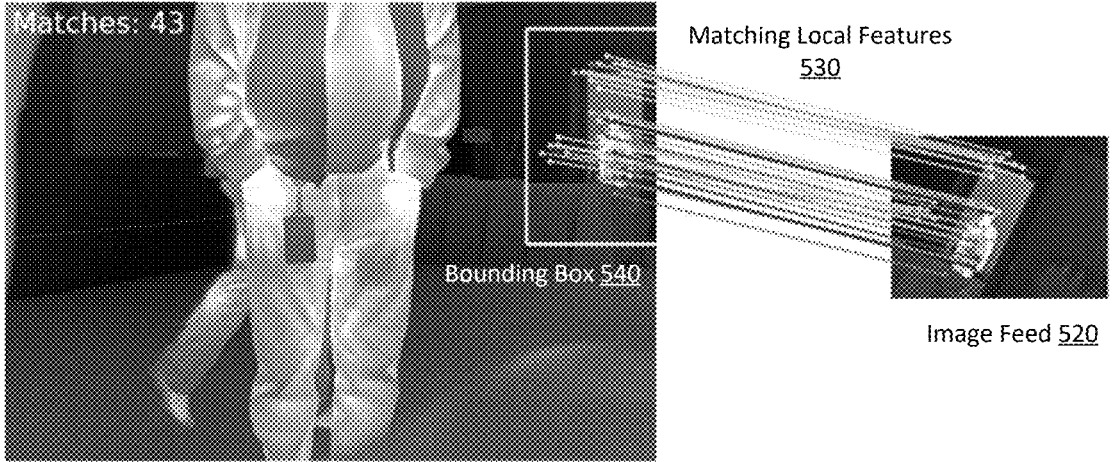
FIG. 5 is a representation of image feeds of devices, according to some embodiments.

FIG. 5 is an illustration of image feeds of devices, according to some embodiments. FIG. 5 can include an image feed 510 of a first device (e.g., the HMD 110 of FIG. 1), an image feed 520 of a second device (e.g., the auxiliary device 120 of FIG. 1), matching local features 530, and a bounding box 540. The image feed 510 and image feed 520 can be indicative of a scenario in which a region of overlap exists among devices, as illustrated by FIG. 3.

The image feed 510 and the image feed 520 can be an image, an image frame, a set of image frames, a video feed, and/or the like. The image feed 510 can be relayed to a processor (e.g., the processor 112 of FIG. 1) by a first image sensor. Similarly, the image feed 520 can be relayed to a processor (e.g., the processor 112 of FIG. 1, the processor 123 of FIG. 1, the processor 132 of FIG. 1, etc.) by a second image sensor. The first image sensor and the second image sensor can each include, for example, a charge-coupled device (CCD), a complementary metal oxide semiconductor (CMOS), a dual gain output (DGO), a single photon avalanche diode (SPAD), and/or a full frame. The first image sensor and the second image sensor can be, for example, a camera, a red-green-blue (RGB) camera, a low light camera, an infrared (IR) camera (as shown in FIG. 5), and/or the like.

The matching local features 530 can be a set of features in the image feed 510 that are substantially similar to a set of features in the image feed 520 such that the sets of features can be a match. A processor can use, for example, template matching, direct pixel comparison, machine learning such as neural networks, k-nearest neighbors (kNN), and/or computer vision such as feature matching algorithms to match the local features 530 among image feeds.

The bounding box 540 while depicted as a rectangle with a white border and without fill can be any visual indicator associated with a region of overlap between image feed 510 and image feed 520. The bounding box 540 can be, for example, a shape, a color, a saturation, a contrast, a brightness, a resolution, and/or the like that can indicate where a region of overlap is positioned in image feed 510.

A processor of the first device (e.g., the processor 112 of FIG. 1) can cause a display (e.g., the display 116 of FIG. 1) to project the image feed 510. The image feed 510 can capture a portion of a 3D scene. The processor of the first device can generate a map of the 3D scene based on local features in the image feed 510. In some instances, the processor of the first device can receive a map of the 3D scene from another device communicatively coupled to the first device. The processor of the first device can also receive the image feed 520 from the second device and can identify local features 530 that match (e.g., using computer vision techniques such as feature matching) to local features in the map of the 3D scene and/or local features in the image feed 510. The processor can determine a region of overlap between the image feed 510 and the image feed 520 based on the matching local features 530. The processor of the first device can further cause the display to project a bounding box 540 associated with the region of overlap. The processor can update the bounding box in the display continuously, periodically, and/or sporadically relative to a change in the region of overlap.

Figure 6:
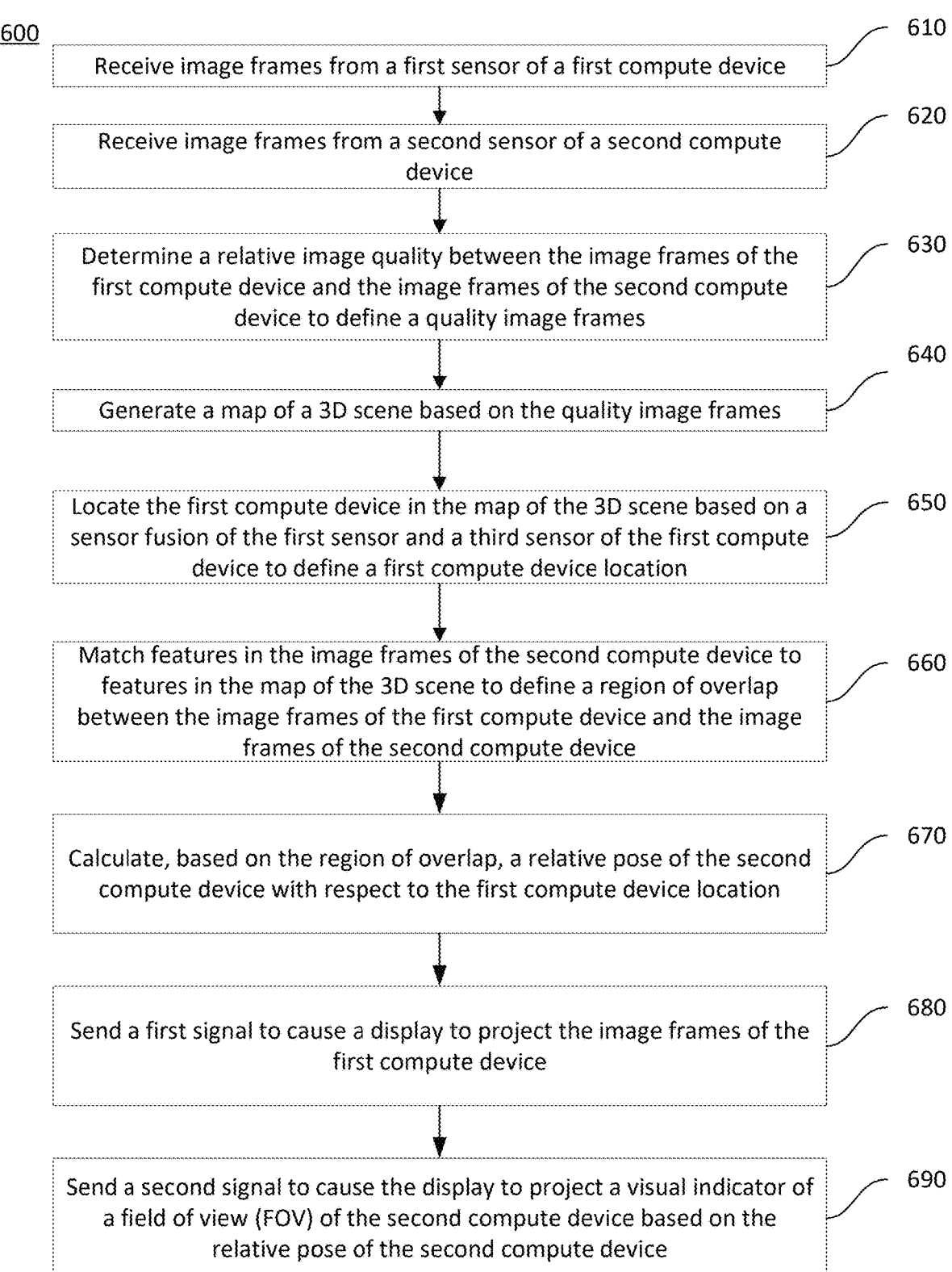
FIG. 6 is a flow chart of a method for multi-device SLAM, according to some embodiments.

FIG. 6 is a flow chart of a method 600 for multi-device SLAM, according to an embodiment. The method can be implemented as code and/or instructions stored in a memory (e.g., the memory 113 of FIG. 1) and executed by a processor (e.g., the processor 112 of FIG. 1). The method can be implemented by, for example, a main device that is functionally and/or structurally similar to the HMD 110 of FIG. 1.

At 610, the processor can receive image frames from a first sensor of a first compute device. The first sensor can be an image sensor such as a camera, an IR camera, and or the like.

At 620, the processor can receive image frames from a second sensor of a second compute device. The second sensor can be an image sensor such as a camera, an IR camera, and or the like.

At 630, the processor can determine a relative image quality between the image frames of the first compute device and the image frames of the second compute device to define a quality image frames. For example, the processor can estimate image quality and/or resolution of image frames using a peak signal-to-noise ratio (PSNR), a structural similarity index (SSIM), a blind and/or reference less image spatial quality evaluator (BRISQUE), a natural image quality evaluator (NIQE), blind image quality index (BIQI), compute vision techniques, and/or the like. The processor can periodically, sporadically, or continuously determine the relative image quality. The processor can update the quality image frames to be either the image frames of the first compute device or the image frames of the second compute device based on the relative image quality. For example, in response to determining that the image frames of the first compute device have a better, higher, or richer image quality than the image frames of the second compute device, the processor can update the quality image frames to be the image frames of the first compute device. In some instances, the processor can update the quality image frames to be the image frames of another compute device (e.g., the compute device 130 in FIG. 1) based on a relative image quality among image frames of the other compute device, the image frames of the first compute device, and the image frames of the second compute device.

At 640, the processor can generate a map of a 3D scene based on the quality image frames. The processor can update the map of the 3D scene based on the relative image quality as determined periodically, sporadically, or continuously/ real-time, relative to determining the relative image quality. Generating and updating the map of the 3D scene with features in the quality image frames can produce a map with higher quality data.

At 650, the processor can locate the first compute device in the map of the 3D scene based on a sensor fusion of the first sensor and a third sensor of the first compute device to define a first compute device location. The third sensor can be a device that measures and/or reports the motion of an object, including for example position, velocity, and acceleration metrics. The third sensor can be, for example, an IMU.

At 660, the processor can match features in the image frames of the second compute device to features in the map of the 3D scene to define a region of overlap between the image frames of the first compute device and the image frames of the second compute device. The processor can match features using, for example, computer vision techniques such as feature matching.

At 670, the processor can calculate, based on the region of overlap, a relative pose of the second compute device with respect to the first compute device location.

At 680, the processor can send a first signal to cause a display (e.g., the display 116 of FIG. 1) to project the image frames of the first compute device. In some instances, in response to a failure of the first sensor of the first compute device, the processor can send a signal to cause the display to project the image frames of the second sensor of the second compute device. In some other instances, in response to a failure of the first sensor of the first compute device and a failure of the second sensor of the second compute device, the processor can send a signal to cause the display to project image frames of another sensor of another compute device (e.g., the compute device 130 of FIG. 1).

At 690, the processor can send a second signal to cause the display to project a visual indicator of a field of view (FOV) of the second compute device (e.g., the narrow FOV 345 in FIG. 3) based on the relative pose of the second compute device. The visual indicator of the FOV can be, for example, a red dot indicating where a line-of-sight in the FOV of the second compute device is pointed, from the perspective of the first compute device. In some instances, the first compute device can determine an absence of the region of overlap between the image frames/FOV of the first compute device and the image frames/FOV of the second compute device. In such instances, the visual indicator of the FOV can be, for example, an arrow pointing in the direction of where a line of sight in the FOV of the second compute device is pointing relative to where a line of sight in the FOV of the first compute device is pointing. In such instances, the visual indicator of the FOV can also be, for example, a number and/or characters indicating a distance from a center of the FOV of the first compute device to a center of the FOV of the second compute device. Similarly, in such instances, the number and/or characters can be positioned on the display to represent where a line of sight in the FOV of the second compute device is relative to a line of sight in the FOV of the first compute device.

In some embodiments, a method includes generating a map of a 3D scene based on a first plurality of image frames of a first compute device; locating the first compute device in the map of the 3D scene to define a first compute device location, based on a sensor fusion of a first sensor and a second sensor of the first compute device; matching a plurality of features in a second plurality of image frames of a third sensor of a second compute device to a plurality of features in the map of the 3D scene, to define a region of overlap between the first plurality of image frames and the second plurality of image frames; calculating, based on the region of overlap, a relative pose of the second compute device with respect to the first compute device location; sending a first signal to display the first plurality of image frames; and sending a second signal to display a bounding box associated with the region of overlap based on the relative pose of the second compute device.

In some embodiments, the second sensor is an inertial measurement unit (IMU). In some embodiments, the first compute device is a head mounted display (HMD), and the second compute device is (1) communicatively coupled to the HMD and (2) physically uncoupled from the HMD. In some embodiments, the first sensor is a first infrared (IR) camera and the third sensor is a second IR camera. In some embodiments, the first signal and the second signal are sent in substantially real-time relative to the first plurality of image frames and the second plurality of image frames.

In some embodiments, the method further includes: updating the map of the 3D scene with inert elements and non-inert elements based on an image segmentation of at least one of the first plurality of image frames and the second plurality of image frames.

In some embodiments, an apparatus includes: a second compute device including a first camera having a first Field-of-View (FOV), and a first sensor; and a first compute device communicatively coupled to the second compute device, the first compute device including: a second camera having a second FOV greater than the first FOV, a second sensor, a display, a processor, and a non-transitory, processor-readable medium storing instructions that, when executed by the processor, cause the processor to: receive a map of a 3D scene; locate, based on a sensor fusion of the second camera and the second sensor, the first compute device in the map of the 3D scene to define a first device location; calculate, based on the map of the 3D scene and the first sensor, a relative pose of the second compute device with respect to the first compute device location; determine, based on the relative pose of the second compute device, a region of overlap between the first FOV and the second FOV; identify, based on the region of overlap, an occluded portion of the second FOV, the occluded portion of the second FOV being a visible portion of the first FOV; and send a signal to cause the display to project a plurality of image frames within the second FOV and to reproject the visible portion of the first FOV.

In some embodiments, the first sensor is a first inertial measurement unit (IMU) and the second sensor is a second IMU. In some embodiments, the first compute device is a head mounted display (HMD) and the second compute device is physically uncoupled from the HMD. In some embodiments, the processor sends a signal to cause the display to reproject the visible portion of the first FOV in substantially real-time. In some embodiments, the first camera is a first infrared (IR) camera and the second camera is a second IR camera.

In some embodiments, the non-transitory, processor-readable medium further stores instructions that cause the processor further to: send a signal to cause the display to project a bounding box, the bounding box being associated with the visible portion of the first FOV.

In some embodiments, the non-transitory, processor-readable medium further stores instructions that cause the processor further to: update the map of the 3D scene with inert elements and non-inert elements based on an image segmentation of at least one of the first plurality of image frames and the second plurality of image frames.

In some embodiments, a non-transitory, processor-readable medium stores instructions that, when executed by a processor, cause the processor to: receive a first plurality of image frames from a first sensor of a first compute device; receive a second plurality of image frames from a second sensor of a second compute device; determine a relative image quality between the first plurality of image frames and the second plurality of image frames to define a quality plurality of image frames; generate a map of a 3D scene based on the quality plurality of image frames; locate, based on a sensor fusion of the first sensor and a third sensor of the first compute device, the first compute device in the map of the 3D scene to define a first compute device location; match a plurality of features in the second plurality of image frames to a plurality of features in the map of the 3D scene, to define a region of overlap between the first plurality of image frames and the second plurality of image frames; calculate, based on the region of overlap, a relative pose of the second compute device with respect to the first compute device location; send a first signal to cause a display to project the first plurality of image frames; and send a second signal to cause the display to project a visual indicator of a field of view (FOV) of the second compute device, based on the relative pose of the second compute device.

In some embodiments, the third sensor is an inertial measurement unit (IMU). In some embodiments, the first compute device is a head mounted display (HMD) operably coupled to the processor, the display is a display of the HMD, and the second compute device is (1) physically uncoupled from the HMD and (2) communicatively coupled to the HMD. In some embodiments, the first signal and the second signal are sent in substantially real-time relative to the first plurality of image frames and the second plurality of image frames. In some embodiments, the first sensor is a first infrared (IR) camera and the second sensor is a second IR camera.

In some embodiments, the non-transitory, processor-readable medium, further stores instructions to cause the processor to: send a third signal to cause the display to project a bounding box associated with the region of overlap, based on the relative pose of the second compute device.

In some embodiments, the non-transitory, processor-readable medium, further stores instructions to cause the processor to: send a signal to cause the display to project the second plurality of image frames of the second sensor of the second compute device in response to a failure of the first sensor of the first compute device.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
generating a map of a 3D scene based on a first plurality of image frames of a first sensor of a first compute device;
locating the first compute device in the map of the 3D scene to define a first compute device location, based on a sensor fusion of the first sensor of the first compute device and a second sensor of the first compute device;
matching a plurality of features in a second plurality of image frames of a sensor of a second compute device to a plurality of features in the map of the 3D scene, to define a region of overlap between the first plurality of image frames and the second plurality of image frames;
calculating, based on the region of overlap, a relative pose of the second compute device with respect to the first compute device location;
identifying a portion of the 3D scene in the first plurality of image frames that is representative of a field of view of the sensor of the second compute device, based on the relative pose of the second compute device;

sending a first signal to display the first plurality of image frames; and
sending a second signal to display a visual indicator that indicates the portion of the 3D scene in the first plurality of image frames.

2. The method of claim 1, wherein the second sensor is an inertial measurement unit (IMU).

3. The method of claim 1, wherein the first compute device is a head mounted display (HMD), and the second compute device is (1) communicatively coupled to the HMD and (2) physically uncoupled from the HMD.

4. The method of claim 1, wherein the first sensor of the first compute device is a first infrared (IR) camera and the sensor of the second compute device is a second IR camera.

5. The method of claim 1, wherein the first signal and the second signal are sent in substantially real-time relative to the first plurality of image frames and the second plurality of image frames.

6. The method of claim 1, further comprising:
updating the map of the 3D scene with inert elements and non-inert elements based on an image segmentation of at least one of the first plurality of image frames and the second plurality of image frames.

7. An apparatus, comprising:
a second compute device including:
a first camera having a first Field-of-View (FOV), and
a first sensor; and
a first compute device configured to be communicatively coupled to the second compute device, the first compute device including:
a second camera having a second FOV greater than the first FOV,
a second sensor,
a display,
a processor, and
a non-transitory, processor-readable medium storing instructions that, when executed by the processor, cause the processor to:
receive a map of a 3D scene;
locate, based on a sensor fusion of the second camera and the second sensor, the first compute device in the map of the 3D scene to define a first device location;
calculate, based on the map of the 3D scene and the first sensor, a relative pose of the second compute device with respect to the first compute device location;
determine, based on the relative pose of the second compute device, a region of overlap between the first FOV and the second FOV;
identify, based on the region of overlap, an occluded portion of the second FOV, the occluded portion of the second FOV being a visible portion of the first FOV; and
send a signal to cause the display to project a plurality of image frames within the second FOV and to reproject the visible portion of the first FOV.

8. The apparatus of claim 7, wherein the first sensor is a first inertial measurement unit (IMU) and the second sensor is a second IMU.

9. The apparatus of claim 7, wherein the first compute device is a head mounted display (HMD) and the second compute device is physically uncoupled from the HMD.

10. The apparatus of claim 7, wherein the processor sends a signal to cause the display to reproject the visible portion of the first FOV in substantially real-time.

11. The apparatus of claim 7, wherein the first camera is a first infrared (IR) camera and the second camera is a second IR camera.

12. The apparatus of claim 7, wherein the non-transitory, processor-readable medium stores further instructions that cause the processor further to:

send a signal to cause the display to project a bounding box, the bounding box being associated with the visible portion of the first FOV.

13. The apparatus of claim 7, wherein the non-transitory, processor-readable medium stores further instructions that cause the processor further to:

update the map of the 3D scene with inert elements and non-inert elements based on an image segmentation of at least one of the first plurality of image frames and the second plurality of image frames.

14. A non-transitory, processor-readable medium storing instructions that, when executed by a processor, cause the processor to:

receive a first plurality of image frames from a first sensor of a first compute device;

receive a second plurality of image frames from a second sensor of a second compute device;

determine a relative image quality between the first plurality of image frames and the second plurality of image frames to define a quality plurality of image frames;

generate a map of a 3D scene based on the quality plurality of image frames;

locate, based on a sensor fusion of the first sensor and a third sensor of the first compute device, the first compute device in the map of the 3D scene to define a first compute device location;

match a plurality of features in the second plurality of image frames to a plurality of features in the map of the 3D scene, to define a region of overlap between the first plurality of image frames and the second plurality of image frames;

calculate, based on the region of overlap, a relative pose of the second compute device with respect to the first compute device location;

send a first signal to cause a display to project the first plurality of image frames; and send a second signal to cause the display to project a visual indicator of a field of view (FOV) of the second compute device, based on the relative pose of the second compute device.

15. The non-transitory, processor-readable medium of claim 14, wherein the third sensor is an inertial measurement unit (IMU).

16. The non-transitory, processor-readable medium of claim 14, wherein the first compute device is a head mounted display (HMD) operably coupled to the processor, the display is a display of the HMD, and the second compute device is (1) physically uncoupled from the HMD and (2) communicatively coupled to the HMD.

17. The non-transitory, processor-readable medium of claim 14, wherein the first signal and the second signal are sent in substantially real-time relative to the first plurality of image frames and the second plurality of image frames.

18. The non-transitory, processor-readable medium of claim 14, wherein the first sensor is a first infrared (IR) camera and the second sensor is a second IR camera.

19. The non-transitory, processor-readable medium of claim 14, further storing instructions to cause the processor to:

send a third signal to cause the display to project a bounding box associated with the region of overlap, based on the relative pose of the second compute device.

20. The non-transitory, processor-readable medium of claim 14, further storing instructions to cause the processor to:

send a signal to cause the display to project the second plurality of image frames of the second sensor of the second compute device in response to a failure of the first sensor of the first compute device.

* * * * *